United States Patent [19]
Maeda

[11] Patent Number: 5,207,093
[45] Date of Patent: May 4, 1993

[54] FAILURE DIAGNOSIS DEVICE FOR AN EGR CONTROL SYSTEM

[75] Inventor: Mie Maeda, Himeji, Japan

[73] Assignee: Mitsubishi Denki Kabushiki Kaisha, Tokyo, Japan

[21] Appl. No.: 821,063

[22] Filed: Jan. 16, 1992

[30] Foreign Application Priority Data

Feb. 26, 1991 [JP] Japan .................................. 3-30608

[51] Int. Cl.$^5$ ........................................... G01M 15/00
[52] U.S. Cl. .................................... 73/118.1; 340/439
[58] Field of Search ......................... 73/118.1; 340/439

[56] References Cited

U.S. PATENT DOCUMENTS 4,671,107  6/1987  Chiesa et al. ........................ 73/118.1

FOREIGN PATENT DOCUMENTS 62-51746  3/1987  Japan .

Primary Examiner—Jerry W. Myracle
Attorney, Agent, or Firm—Sughrue, Mion, Zinn, Macpeak and Seas

[57] ABSTRACT

A failure diagnosis device for an EGR control system detects a predetermined running condition of the engine, and includes a control device which inputs values of predetermined parameters signifying the running condition of the engine at first predetermined times. The control device calculates differences between preceding input values and current input values, accumulates the differences, and opens the EGR path after determining that the EGR control system is normal, i.e. when the accumulated value reaches or exceeds a predetermined value after a second predetermined time has elapsed from when the EGR path is forcibly closed. The control device determines that the EGR control system has failed and generates an alarm when the accumulated value is below the predetermined value when the second predetermined time has elapsed.

1 Claim, 5 Drawing Sheets

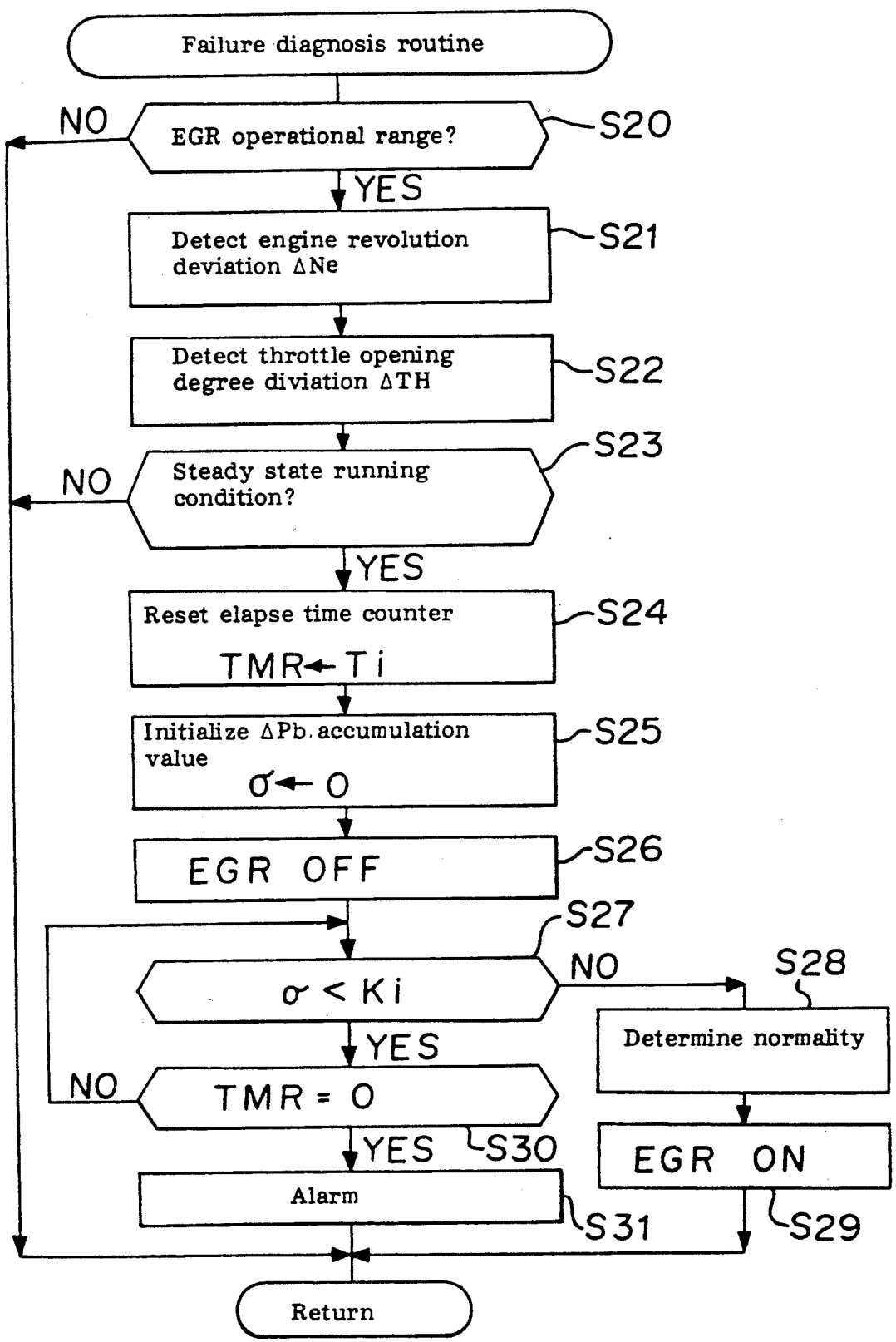

FAILURE DIAGNOSIS DEVICE FOR AN EGR CONTROL SYSTEM

BACKGROUND OF THE INVENTION

1. Field of the Invention

This invention relates to a failure diagnosis device of an exhaust gas recirculation (hereinafter, EGR) control device wherein when a failure diagnosis is performed on the EGR control device which recirculates a portion of the exhaust gas of an internal combustion engine back to an intake pipe of the internal combustion engine, the time to close an EGR pipe is made as short as possible, thereby alleviating mental shock to a driver, and preventing deterioration of the exhaust gas.

2. Discussion of Background

A conventional failure diagnosis device for an EGR, control device controls the opening and closing of the EGR pipe, memorizes running conditions of the engine when the device performs opening and closing operations, respectively, and determines the failure of the EGR pipe by the difference between the two memorized values, as disclosed in Japanese Unexamined Patent Publication No. 51746/1987.

With the conventional failure diagnosis device of an EGR control device is composed as above, the opening and closing of the EGR pipe for the failure diagnosis are performed when the engine is in a steady state. Furthermore, since the conventional device compares predetermined running conditions (for instance, intake pipe pressures) when the opening of the EGR pipe is operated, with those when the closing of the EGR pipe is operated it is necessary to continue the closing operation of the EGR pipe until a predetermined running condition in the closing operation becomes stabilized. Therefore it is necessary to continue the steady state of the engine until the running condition is stabilized.

Furthermore, the above closing operation causes mental shock to a driver, and deteriorates exhaust gas emission more than before the operation when the EGR control devices are normally operated.

SUMMARY OF THE INVENTION

It is an object of the present invention to provide a failure diagnosis device of an EGR control device which alleviates the mental shock to a driver when the EGR pipe is operated to open or to close for the failure diagnosis, and prevents deterioration of the exhaust gas.

According to an aspect of the present invention, there is provided a failure diagnosis device of an EGR control device which comprises: an exhaust gas recirculation control means which opens and closes an exhaust gas recirculation pipe which recirculates exhaust gas at an exhaust pipe of an engine to an intake pipe thereof; a detecting means for detecting a predetermined running condition of the engine; and a control device which inputs values of predetermined parameters signifying the predetermined running condition of the engine always at every first predetermined time, calculates differences between preceding input values and current input values, accumulates the differences, controls the opening of the exhaust gas recirculation control means after determining the exhaust gas recirculation control means as normal, when the accumulated value becomes a predetermined value or more when a second predetermined time elapses from when the exhaust recirculation control means is controlled from an open state to a closed state, and determines the exhaust gas recirculation means as abnormal and generates an alarm when the accumulated value falls below the predetermined value when the second predetermined time elapses.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a flow chart of a failure diagnosis routine of the EGR for explaining the failure diagnosis device of an EGR control device of FIG. 1.

DETAILED DESCRIPTION OF THE PREFERRED EMBODIMENTS

Figure 1:
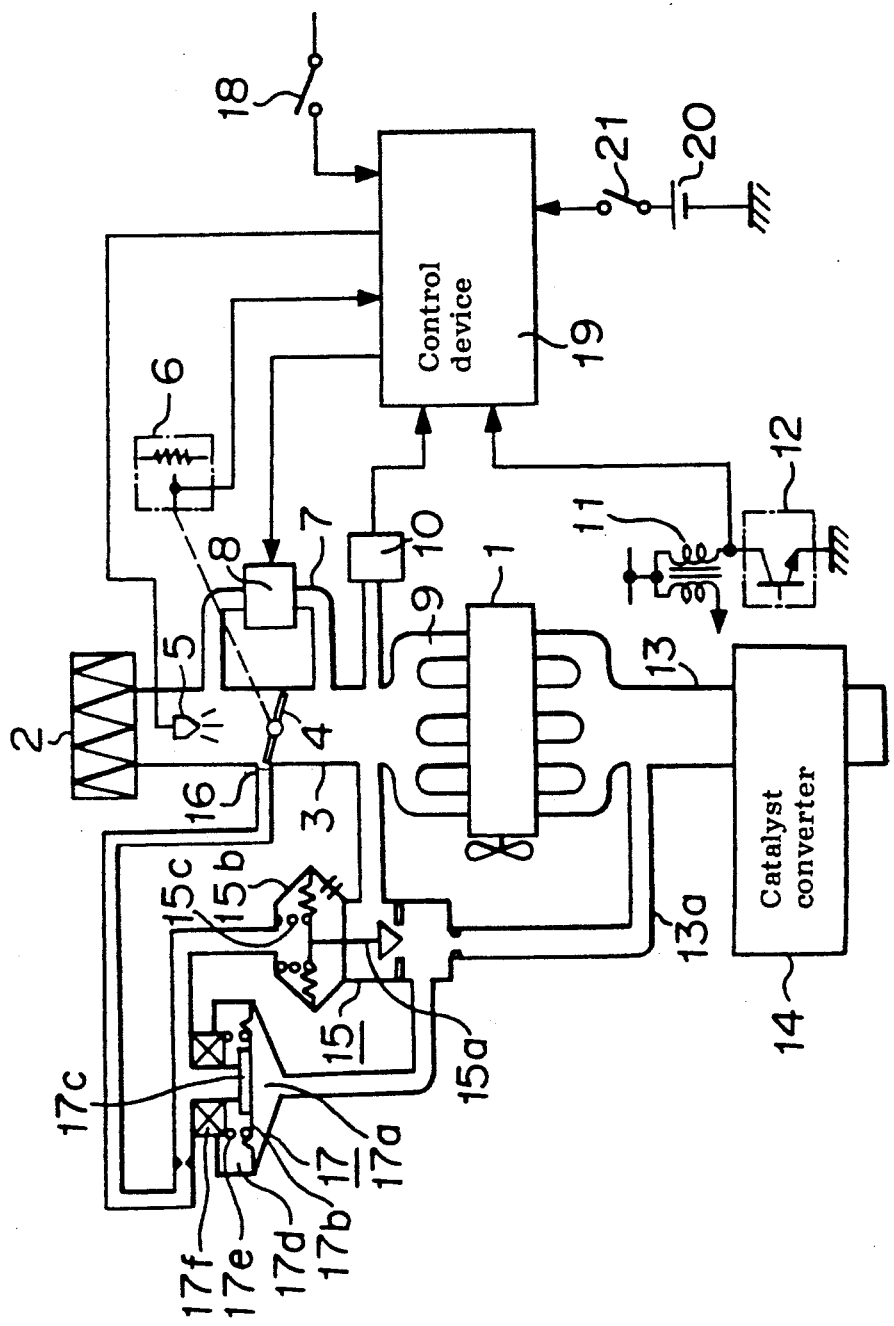
FIG. 1 is an explanatory diagram showing a total structure of an embodiment of a failure diagnosis device of an EGR control device according to the present invention.

In the following explanation will be given to embodiments of a failure diagnosis device of the EGR control device according to the present invention, based on the drawings. FIG. 1 is an explanatory diagram showing the construction of an embodiment of the device, wherein a well-known four cycle spark ignition type engine 1 mounted on a vehicle, sucks air for combustion mainly through an air cleaner 2, an intake pipe 3, and a throttle valve 4.

Furthermore, fuel is supplied by an injector 5 provided on the upstream side of the throttle valve 4 of the intake pipe 3 from a fuel system (not shown). A throttle sensor 6 detects a throttle opening degree $\Theta$ of the throttle valve 4, and outputs a signal corresponding to the throttle opening degree $\Theta$.

At an entrance portion of an intake manifold portion 9 on the downstream side of the intake pipe 3, an absolute pressure PB in the intake pipe 3, is detected by a pressure sensor 10, as a running condition detecting means. This pressure sensor 10 outputs a signal corresponding to the intake pipe pressure PB.

The primary side of an ignition coil 11 is connected to a power source and to a transistor at the last stage of an igniter 12, and the secondary side of the ignition coil supplies high voltage to ignition plugs (not shown) provided at respective cylinders of the engine 1.

At least a portion of the exhaust gas of the engine 1 is exhausted outside of the engine through an exhaust pipe 13 and a catalyst converter 14 which removes injurious components.

Furthermore, an exhaust gas recirculation pipe (EGR pipe) connects the exhaust pipe 13 with a negative pressure port of the EGR. A portion of the exhaust gas which is shunted to an exhaust gas branch 13a connected to the exhaust pipe 13, is recirculated to the engine 1 by flowing in the downstream side of a bypass air passage 7 of the intake pipe 3 through an EGR control valve 15 which constitutes the EGR control device along with an exhaust pressure transducer 17. An EGR negative pressure port 16 is provided at the intake pipe 3 on the upstream side of the end portion of the fully closed throttle valve 4.

Naturally, this EGR negative pressure port 16 is situated between both portions of the bypass air passage 7 connected with the intake pipe 3. The exhaust pressure transducer 17 introduces negative pressure PEGR from the EGR negative pressure port 16 and exhaust pressure from the exhaust gas branch pipe 13a. This exhaust pressure transducer 17 introduces the negative pressure PEGR or the atmospheric pressure to the EGR control valve 15 depending on the condition of the introduced pressures.

This EGR control valve 15 is composed of an element 15a including a diaphragm, a negative pressure chamber 15b, and a spring 15c. The exhaust pressure transducer 17 is composed of an exhaust pressure chamber 17a, a diaphragm 17b, a port 17c which opposes the diaphragm 17b and connects to the EGR negative pressure port 16 and the negative pressure chamber 15b, an atmospheric pressure introducing chamber 17d next to the exhaust pressure chamber 17a, a spring 17e, and a filter 17f for introducing the atmospheric pressure. These compose a so-called exhaust pressure control system EGR device. A reference numeral 18 designates an air conditioner switch, and 21, a key switch.

Figure 2:
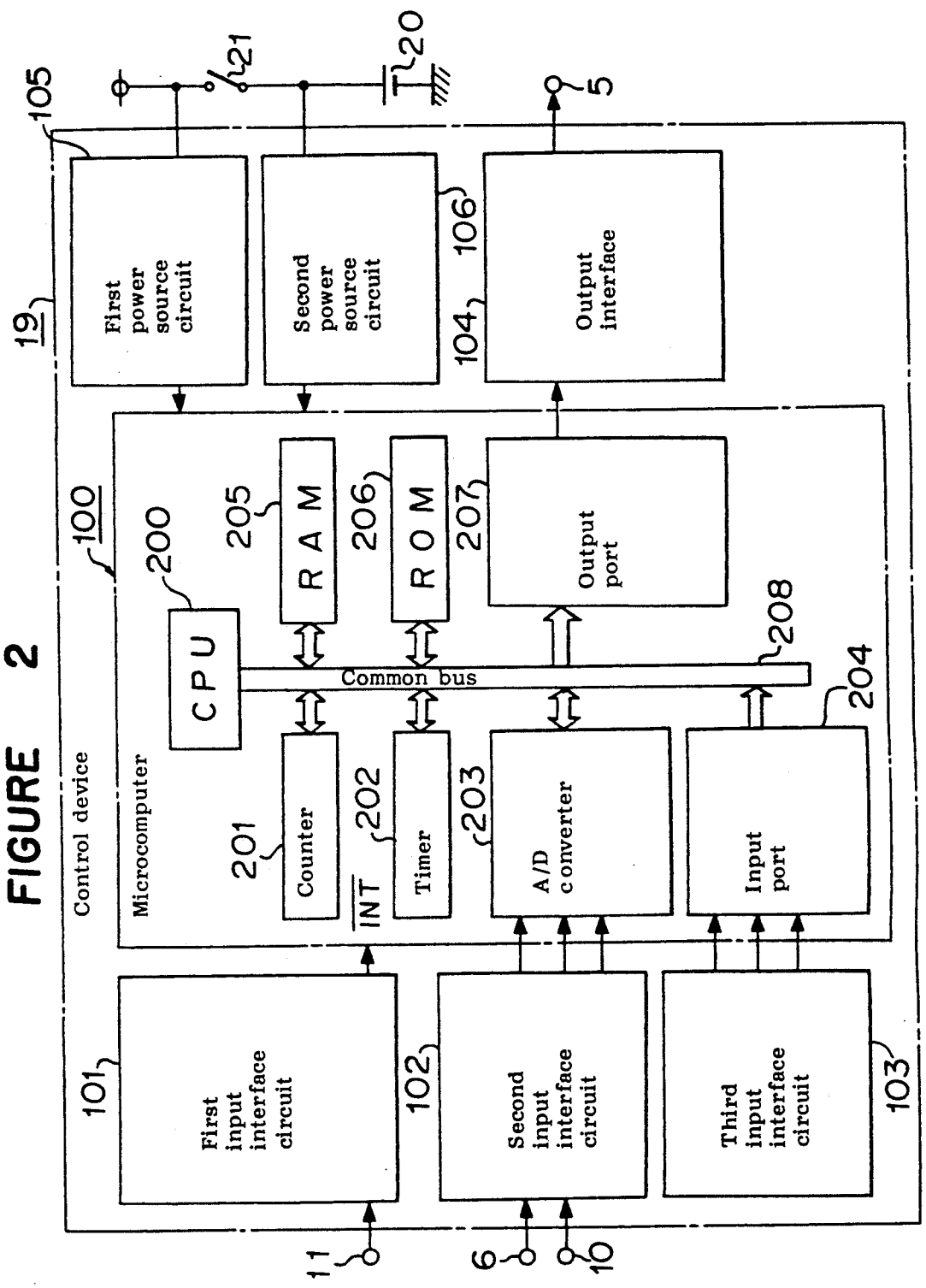
FIG. 2 is a block diagram showing a detailed structure of the inner part of the failure diagnosis device of an EGR control device of FIG. 1.

FIG. 2 is a block diagram showing the inner structure of a control device 19 in FIG. 1. In FIG. 2, a microcomputer 100 is composed of a CPU 200 which performs various calculation and determination, a counter 201 for measuring a revolution period, a timer 202 for measuring a drive time, an A/D converter 203 which converts analogue input signals to digital signals, an input port 204 which inputs digital signals from an input interface circuit 103 which inputs a pulse signal of a vehicle speed sensor (not shown) and transfers them to the CPU 200, a RAM 205 as a work memory, a RAM 206 which stores a main flow program shown in FIG. 3 or the like, an output port 207 for outputting order signals from the CPU 200 and a common bus 208.

Furthermore, an ignition signal from the primary side of the ignition coil 11 receives a wave-form-shaping by a first input interface circuit 101, and is inputted to the microcomputer 100 as an interruption signal. At every interruption, the CPU 200 of the microcomputer 100 reads a value of the counter 201, and calculates the revolution period by the difference between it and a preceding value.

Thereafter, the microcomputer 100 calculates a revolution number data Ne which signifies an engine revolution number NE. The analogue output signals from the throttle sensor 6 or the pressure sensor 10 are removed of their noise components and amplified by the second input interface circuit 102, and sent to the A/D convertor 203, where they are converted to the respective digital data of the throttle opening degree value $\theta(\Theta\theta)$ representing the throttle opening degree $\Theta$, and the intake pipe pressure value Pb (PB Pb) representing the intake pipe pressure PB.

The CPU 200 calculates the injector drive time based on the input data and measures the time corresponding to the calculation results by the timer 202, synchronizing with the interruption signal.

At the start and finish of the measured time, the CPU 200 provides order signals of drive starting and drive finishing to an output interface circuit 104 through an output port 207. The output interface circuit 104 drives to open the valves by supplying the drive signal to the injector 5 during the period between the start and the finish of the order signal.

A first power source circuit 105 supplies the voltage of the battery 20 after making it constant to the microcomputer 100 when the key switch 21 shown in FIG. 1 is ON, by which the microcomputer 100 starts operating. A second power source circuit 106 makes the voltage of the battery 20 a predetermined voltage, and applies it to the microcomputer 100. The control device 19 is composed of the elements of the above notations of 100 to 106.

Figure 3:
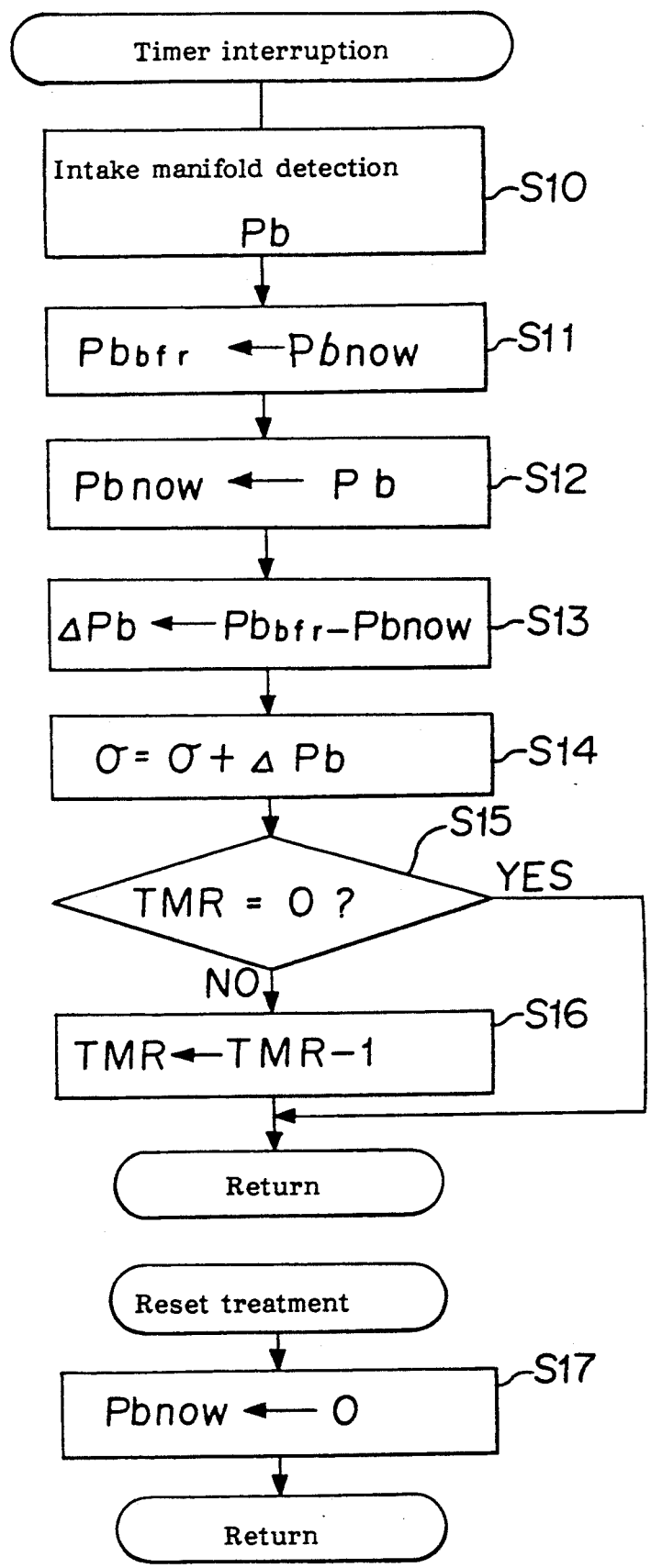
FIG. 3 are flow charts of a timer interruption routine and a treating routine for resetting time for explaining the failure diagnosis device of an EGR control device of FIG. 1.

Next, explanation will be given to the operation of the CPU 200 based on the flow charts of FIGS. 3 and 4. First of all, the timer interruption shown in FIG. 3 is generated at every predetermined time (for instance 1 ms). In FIG. 3, in step S10, the operation reads the intake manifold pressure value Pb.

In step S11, the operation memorizes the intake manifold pressure value $Pb_{now}$ which is read in at a preceding interruption time, as $Pb_{bf}$. In step S12, which operation memorizes the intake manifold pressure pb which is read in by the current interruption, as $Pb_{now}$.

In step S13, the operation calculates the difference $\Delta Pb$ obtained from the intake manifold pressure values $Pb_{bf}$ and $Pb_{now}$ by $\Delta Pb = Pb_{bf} - Pb_{now}$, and goes to step S14. In step S14, the Operation calculates the accumulation value $\sigma$ by $\sigma = \sigma + \Delta Pb$ ($\sigma$ designates the accumulation value of the difference $\Delta Pb$ until the current interruption).

In step S15, the operation determines whether the value TMR of the elapsed time counter 201 for determination of EGR failure is 0. When the operation determines the value of TMR as 0, the operation repeats the interruption routine. Furthermore, in step S15, when the value of the counter 201, TMR is not 0, the operation decrements the counter (TMR = TMR − 1) in step S16. However, the operation clips the value of the counter 201, TMR by 0.

Moreover, when a resetting treatment is performed, the operation resets the intake manifold pressure value $Pb_{now}$ which is read in at the preceding time, to 0.

Next, explanation will be given to the failure diagnosis routine of the EGR shown in FIG. 4. In FIG. 4, in step S20, the operation determines whether the EGR is in an operational range or not, from the running condition of the engine. When the EGR is not in the operational range, the operation does not perform the failure diagnosis, and instead returns from the NO side of step S20.

Furthermore, in step S20, if the EGR is in the operational range, in step S21, the operation obtains a deviation $\Delta Ne$ of Ne per a predetermined time from the engine revolution data Ne which is calculated based on the already obtained revolution period. In the next step S22, the operation obtains a deviation $\Delta TH$ of the throttle opening degree data TH per a predetermined time from the throttle opening degree data TH.

In step S23, the operation determines whether the above deviation $\Delta Ne$ and the deviation $\Delta TH$ are at predetermined values or below, and from the result of the determination, the operation determines whether the engine is in a steady state running condition or not. When the engine is found not to be in the steady state running condition as a result of the determination, the operation does not perform the diagnosis, thus preventing erroneous diagnoses, and returns to the main routine from the NO side of step S23.

Furthermore, when the operation determines that the engine is in a steady state running condition as a result of the determination in step S23, the operation goes to step S24, and the operation sets the initial value Ti to the value TMR of the elapsed time counter for EGR failure determination.

Figure 5A:
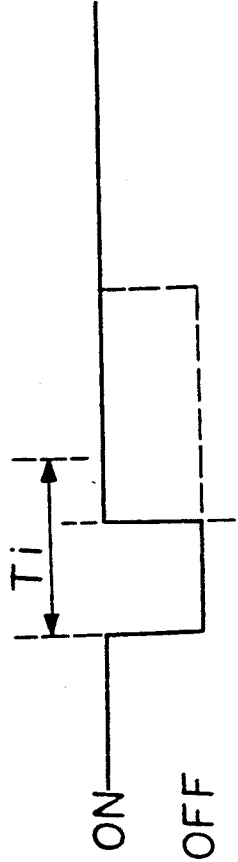
FIGS. 5A, 5B and 5C are explanatory diagrams showing a relationship among EGR ON/OFF signals, an intake manifold pressure value and mental shock compared with a conventional case, for explaining the failure diagnosis device of an EGR control device.
Figure 5B:
Figure 5C:

In step S25, the operation initializes the accumulation value $\sigma$ of the difference $\Delta Pb$ between an intake manifold pressure value $Pb_{bf}$ which is read in the preceding interruption time, and an intake manifold value $Pb_{now}$ which is read in the current time, and goes to step S26. In step S26, the operation controls the EGR pipe forcibly from open to close, as shown in FIG. 5A. In FIGS. 5A, 5B and 5C show the relationship among the EGR ON/OFF signal, the intake manifold pressure value Pb and the mental shock, wherein line signifies the case of this invention, and the dotted line, the conventional case. As shown in FIG. 5B, by closing the EGR pipe, the intake manifold pressure value Pb gradually decreases with a predetermined delay time, when the EGR pipe is closed as shown in FIG. 5A. Furthermore, as shown in FIG. 5C, compared with the conventional case of the dotted line, the mental shock on the driver is alleviated more in case of this invention shown by the bold line.

In step S27, the operation compares the accumulation value $\sigma$ with a predetermined value Ki which corresponds to the running condition of the engine. When $\sigma \geq Ki$, the treatment routine shunts from the NO side of step S27 to step S28. In step S28, the operation determines that the EGR device is normally operated, and in step S29, controls the EGR pipe from CLOSE to OPEN.

Furthermore, in step S27, when the operation determines $\sigma < Ki$, the operation goes from the YES side of step S27 to step S30, wherein the operation compares the counter value TMR with 0. When TMR$\neq$0, the operation goes from the NO side of step S30 to step S27 again. Furthermore, when the counter value TMR=0, in step S30, the operation determines the failure of the EGR device, and actuates an alarm in step S31.

As mentioned above, according to the invention, the predetermined running condition of the engine is always detected at every predetermined interval, and the difference between the detected values at the preceding detecting time and the current detecting time, is accumulated, and when the accumulated value is equal to or more than a predetermined value, the operation determines that the EGR control device is normal, and opens the EGR pipe. When the accumulated value is below the predetermined value after a predetermined time elapses, the operation determines the failure of the EGR control device. Therefore, the operating time for closing the EGR pipe for the failure determination can be made as short as possible, the mental shock on the driver can be alleviated, and the deterioration of the exhaust gas can be prevented.

Furthermore, the failure diagnosis can be performed even when the time to reach the steady state on the condition of the engine, is shorter than that in the conventional case, whereby chances to perform the failure diagnosis are increased thereby promoting the reliability thereof.

Obviously, numerous modifications and variations of the present invention are possible in light of the above teachings. It is therefore to be understood that within the scope of the appended claims, the invention may be practiced otherwise than as specifically described herein.

What is claimed is:

1. A failure diagnosis device for an EGR control system, said device comprising:
   a) an exhaust gas recirculation control means for opening and closing an exhaust gas recirculation pipe which recirculates exhaust gas at an exhaust pipe of an engine to an intake pipe thereof;
   b) detecting means for detecting a predetermined running condition of the engine; and
   c) control device which inputs values of predetermined parameters signifying the predetermined running condition of the engine at each of a plurality of recurring first predetermined times, said control device;
      i) calculating differences between preceding input values and current input values,
      ii) accumulating the differences,
      iii) determining the exhaust gas recirculation control means to be normal when the accumulated value is equal to or greater than a predetermined value when a second predetermined time has elapsed from when the exhaust gas recirculation pipe is forcibly closed,
      iv) enabling the exhaust gas recirculation control means in response to a normal determination,
      v) determining the exhaust gas recirculation control means to be abnormal when the accumulated value is below the predetermined value when the second predetermined time has elapsed, and
      vi) generating an alarm in response to an abnormal determination.

* * * * *